United States Patent [19]

Fisher

[11] 4,233,747
[45] Nov. 18, 1980

[54] THREE DIMENSIONAL LAYOUT TOOL

[75] Inventor: Richard A. Fisher, Cheasapeake, Va.

[73] Assignee: Globe Iron Construction Co., Inc., Norfolk, Va.

[21] Appl. No.: 79,444

[22] Filed: Sep. 27, 1979

[51] Int. Cl.³ .......................... G01B 5/14; B23Q 35/02
[52] U.S. Cl. .................................. 33/174 R; 33/189; 33/464
[58] Field of Search .................. 33/464, 174 R, 174 G, 33/189 R, 191, 415, 481

[56] References Cited

U.S. PATENT DOCUMENTS

| 1,382,271 | 6/1921 | Cunningham | 33/189 |
| 1,826,807 | 10/1931 | McDanel | 33/189 X |
| 3,731,390 | 5/1973 | Sloan | 33/189 |

Primary Examiner—Harry N. Haroian
Attorney, Agent, or Firm—Kerkam, Stowell, Kondracki & Clarke

[57] ABSTRACT

A layout tool for defining points on rolled metal H beams comprises a U shape frame having a hand hold in the bight of the U. One leg of the frame is longer than the other and terminates at its end in a stabilizing and guide member extending perpendicular thereto. The guide member has a flat wear surface adapted to be positioned against the working line of the beam on the external surface of the beam to which all measurements are taken. The other leg of the frame slidingly supports in a channel provided therein a T scale having a flat stabilizing base member adapted to rest on the web of the beam. A locking mechanism is provided in the second leg which includes a thumb screw for locking the scale in position in the channel. The scale is disposed at right angles to the legs and the stabilizing and guide member such that the layout tool allows orthogonal lines to be scribed in any one position of the tool.

5 Claims, 4 Drawing Figures

THREE DIMENSIONAL LAYOUT TOOL

BACKGROUND OF THE INVENTION

1. Field of the Invention

This invention relates to tools and more particularly to a layout tool or gauge for rolled metal H beams and the like, and has for its object the provision of an improved layout tool having orthogonal edges and surfaces which may be used to lay out points on the web and flanges of a beam. Points laid out on the web of a beam are scribed at the same distance from the outside face of the beam flange and tolerance of the flange angle is determined without requiring separate measurements at each location.

2. Description of the Prior Art

Structural steel fabrication requires the placing of chalk lines on non-uniform rolled shapes from specific points and working lines. The purpose of these chalklines is to locate holes and other details for later drilling, cutting, punching or welding. In the normal fabrication process, after the holes and details have been located, as a manner of quality control, these dimensions must be checked quickly and reliably.

In shop drawings which set out the dimensions on non-uniform rolled shapes, the shapes are treated as being perfect. In actuality, the material as produced is non-uniform in that one of the beam flanges may be slanted such that the flanges are non-parallel and non-perpendicular to the web surface on which points and working lines must be scribed. For these reasons, all dimensions are taken to a known point or line on a rolled section which is located on the outside surface of a flange at a point which intersects with the center line of the web.

Heretofor, layout tools for rolled metal H beams take the form of a hand held straight edge having a channel clearance for the end flange. One such layout tool is shown and described in U.S. Pat. No. 1,826,807. The tool shown and described in the foresaid patent takes the form of a thin strip of metal one end of which is pressed against the point to which all dimensions are taken. The other end of the tool, that is, the end which extends along the surface of the web, is provided with suitable scale markings and indicia and is held against the surface. It should be readily apparent that a tool of this nature occupies both hands of a worker and an additional worker is necessary to scribe any necessary measurement lines because of instability of the tool. Further, inasmuch as the tool comprises a fixed rule portion, it can only be used for certain size beams wherein the width of the web is greater than the length of the rule.

SUMMARY OF THE INVENTION

In accordance with the present invention, these and other disadvantages are eliminated by providing a hand held layout tool which may be stably positioned on a web and held thereon with a single hand, freeing the other hand for scribing and layout and which includes an adjustable scale.

Another advantage of the present invention is to provide a layout tool which enables the scribing of orthogonal lines.

A further advantage of the present invention is to provide a layout tool which enables quick and accurate quality control checks to be made with respect to shop-driled holes made in accordance with shop drawings.

BRIEF DESCRIPTION OF THE DRAWINGS

These and other advantages will be readily apparent from the following description taken in connection with the following drawings wherein.

DESCRIPTION OF THE PREFERRED EMBODIMENT

Figure 1:
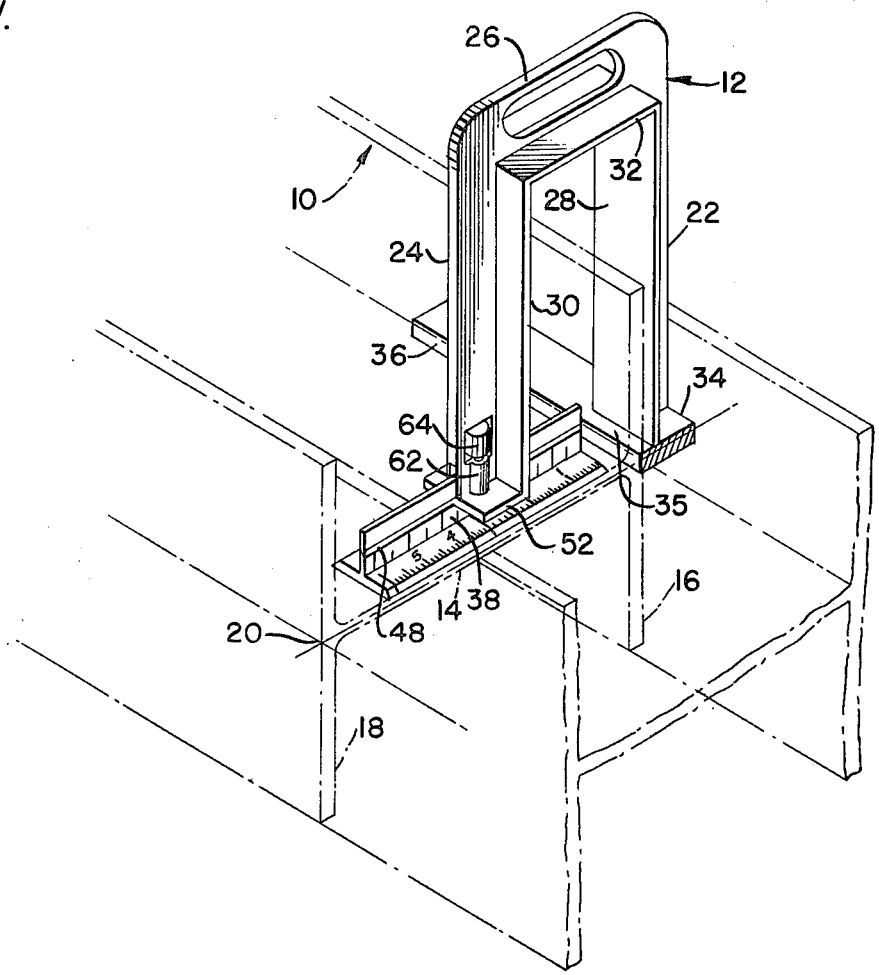
FIG. 1 is a perspective view of the gauge of the present invention in operative position on a rolled metal H beam shown in phantom lines.

Referring now to the drawings and in particular to FIG. 1, reference character 10 designates generally an H beam with which the novel and improved layout tool 12 of the present invention is used. H beam 10 includes a central flat web section 14 having flanges 16 and 18 extending upwardly and downwardly, as viewed in the drawings, from opposite ends. Theoretically, the flanges should extend at right angles to the web and the web should be of a predetermined thickness. However, rolled shapes are notoriously non-uniform in dimension. For example, one or both of the flanges may be at an angle other than 90° with respect to the web either in the same or both directions and the web from beam to beam may be of different thicknesses. For this reason, all dimensions with respect to a rolled beam are taken from a central point or line 20 located on the outside of a flange along the center line of the web.

Figure 2:
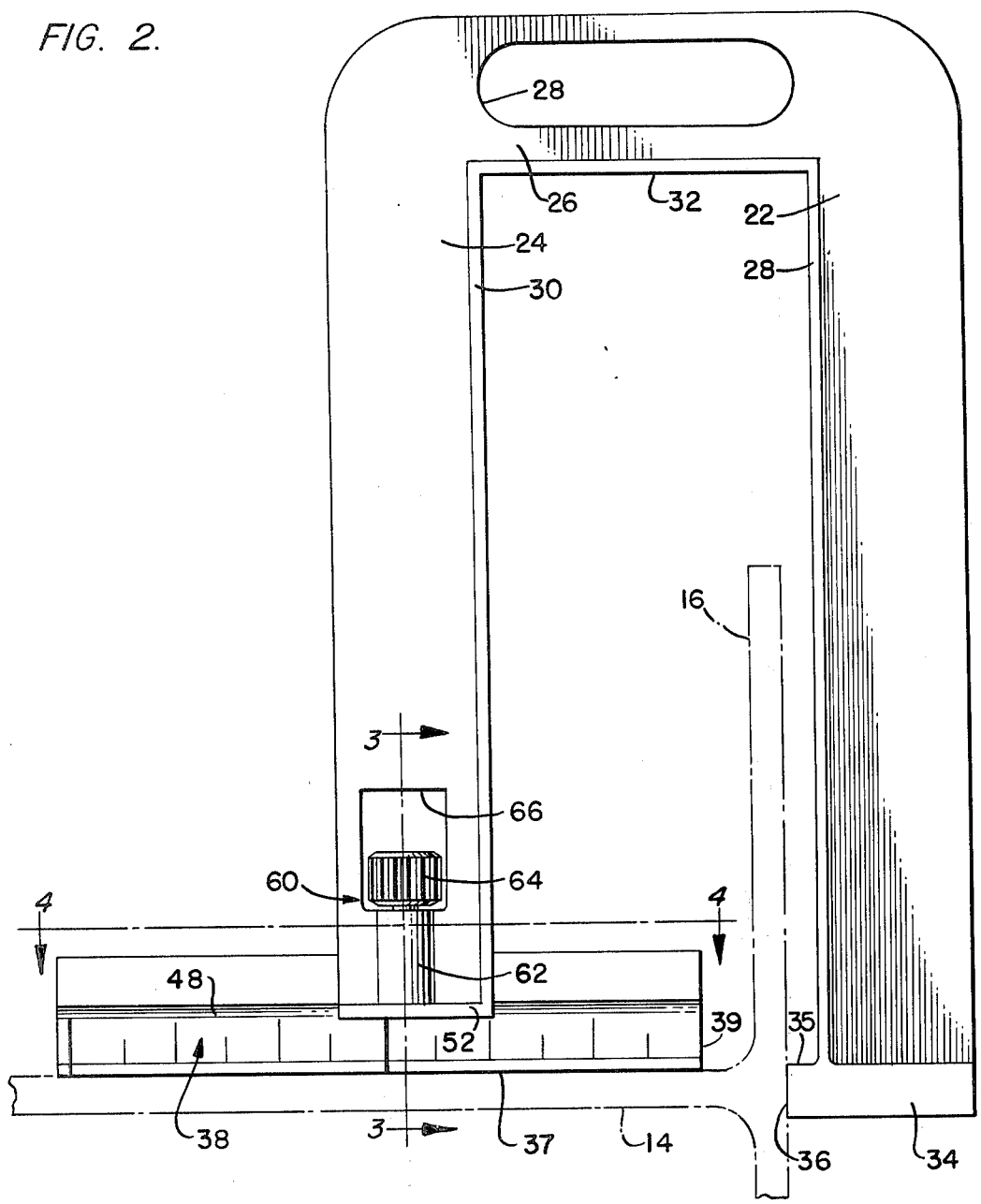
FIG. 2 is a right side elevational view of the layout tool of the present invention.
Figure 4:
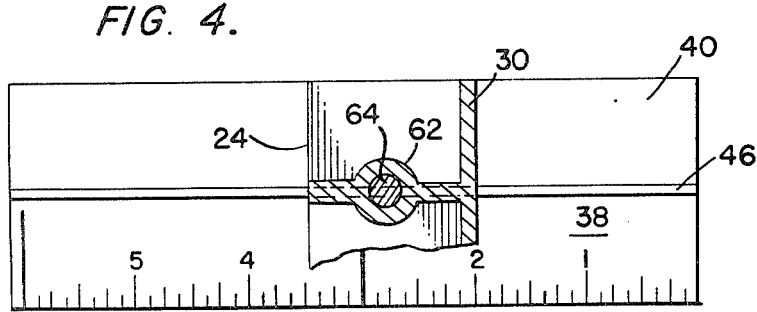
FIG. 4 is a fragmentary view of the scale clamping mechanism taken along lines 4—4 of FIG. 2.

Referring to FIG. 2, tool 12 comprises a U shaped frame portion having vertical leg members 22 and 24, joined together by a rib 26. Rib 26 is advantageously provided with an aperture 28 which provides a convenient hand hold section for manipulation of the tool. Each leg 22 and 24 and rib 26 have joined to their inner edges and extending at right angles thereto corresponding plate sections 28, 30 and 32 which strengthen the tool and whose edges can be used as guides for scribing vertical lines, as viewed in the drawing, on the inner and outer surfaces of beam flanges 16 and 18, which lines are orthogonal to horizontal lines scribed in the web or flange.

As best shown in FIG. 2, leg 22 is longer than leg 24 and terminates at its lower end in a squaring bar 34 which is substantially rectangular in shape. Bar 34 includes a flat wear surface 35 adapted to be positioned against the outer flat surface of flange 16 at the point at which measurements are to be taken. It should be noted that bar 34 has a substantial horizonal length relative to the thickness of leg 22 as shown in FIG. 1 and extends laterally perpendicular to leg 24 to provide an additional horizonal scribe guide surface for scribing horizonal lines along the outer surface of the flanges. Further, because of the thickness and length of wear surface 36, the tool is stable when positioned against the beam.

Figure 3:
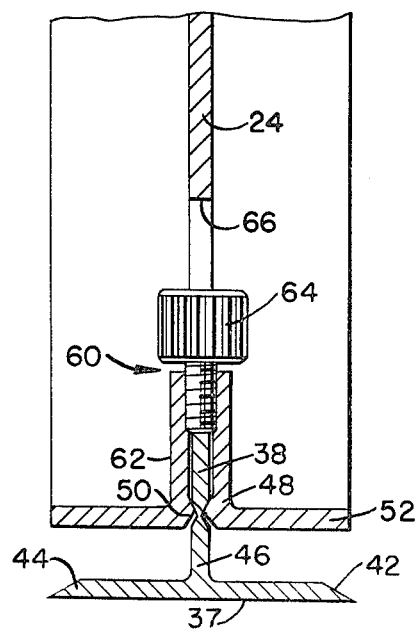
FIG. 3 is a view of the scale clamping mechanism taken along lines 3—3 of FIG. 2.

Referring again to FIG. 2, it can be seen that leg 24 terminates in a scale locking arrangement which slidingly supports a stainless steel T shaped scale 38 which is orthogonally disposed with respect to the legs 22 and 24 and squaring bar 34, Scale 38 includes a flat stablizing base surface 40, shown best in FIG. 3, adapted to lie flat on the top surface of web 14 as shown in FIG. 1. Base surface 40 includes bevelled edges 42 and 44. A vertical leg 46 extending upwardly from the base 40 includes a groove or channel 48 on each side which is adapted to receive opposite facing pointed ends 50 provided in base member 52. Leg 46 extends into channel 54 provided in the lower portion of leg 24. As can be readily appreciated, the surfaces associated with pointed ends 48 and 50 form an engaging rail along which the scale may slide. Scale 38 has the usual scale markings which may be further highlighted or notched at 3 inch intervals to provide a higher visibility and provide a guide for chalk stick scribing of layout lines with respect to more common measurements.

In the preferred embodiment, a groove 48 is provided in both sides of leg 46 and extends the entire length of the scale so that the scale may be readily removed from the frame member and replaced by one of greater or shorter length depending on the dimension of the H beam with which the tool is to be used. However, a groove may be provided on only one side and may extend less than the entire distance.

A locking mechanism 60 is provided at the end of leg 24 for securely locking the scale in place. To this end, a channeled boss 62 extends upward from base member 52 as seen in FIG. 3 and has its internal surfaces threaded to receive a cooperating finger locking bolt 64. Leg 24 has an aperture or window 66 cut therein to permit the bolt 64 to be threaded into the boss with the head positioned in the window and the narrowed portion of the head of bolt 64 extending in the aperture and the bottom of the shank frictionally engaging the top edge of the leg 46 to lock the scale 38 in place.

In operation, assuming it is necessary to chalk mark web hole locations in an H beam, the following procedure will be followed. A layout tool of the type described having a suitable length scale according to the size of the beam being worked on is selected and the scale preset so that the end 39 of the scale 38 is three inches from the wear surface 36, assuming holes are to be marked on 3 inch centers transverse of the longitudinal axis of the beam. It should be noted that the groove in scale 38 is positioned such that the bottom surface 37 of scale 38 coincides with the top surface 35 of the squaring bar 34. Thus, a convenient reference scale may be placed flat against the bottom surface 37 with its edges against wear surface 36 and scale 38 slid inwardly or outwardly until its end 39 is exactly 3 inches from the wear surface. Advantageously, scale 38 incudes periodic 3 inch marks highlighted along its length since this is a frequently used spacing of holes in rolled webs. Having set the position of the scale, it is locked in place by threading down on thumb screw 64. Next, a horizontal tape line is stretched from the left hand end of the beam to provide hole locations along the longitudinal axis of the beam. The beam is marked, for example, at the 3 inch; 5 foot 3 inch; 5 foot 6 inch; and 10 foot 6 inch distances from the left hand end of the beam. The tool is then positioned with the wear surface 36 at the working point 20 to scribe center lines both vertically and horizontally 3 inches and 6 inches from the working point 20 at each of the locations marked from the end of the beam. The result is that hole lines are provided which are parallel to the beam working line and square to the flange. Thus, when the holes are predrilled for mounting the beam on location, the contractor can be assured that the holes are properly located and redrilling or reaming of the beam will not be required on location.

The tool may also be used for checking flange out-of-square tolerances. To this end, wear surface 36 may extend from plate 28 a distance equal to the tolerance of the beam. With surface 36 at the working point, if a flange is skewed so that its upper edge touches the plate affixed to the leg, this indicates that the beam is out of tolerance. In this manner, a quick and accurate tolerance check of all flanges can be made along the length of the beam which avoids the necessity of taking measurements and thereafter calculating whether the beam is in tolerance. The tool may also be used to square around the beam by making chalk lines on flanges. Still another advantage of the tool is that it may be efficiently utilized by the final quality control inspector to make quality control checks that ensure that all predrilled holes are properly placed and that the flanges are in tolerance before the beam is shipped to the field.

While the preferred embodiment of the invention has been described, it will be apparent to those skilled in the art that various modifications thereof may be made without departing from the true spirit of the invention. Accordingly, resort should be made to the appended claims which define the full scope of the invention.

I claim:

1. A tool for layout of H beams, comprising a U shaped frame having a first leg, a second leg and a rib joined to one end of each leg, said first leg being longer in length than said second leg and terminating at its other end in a rectangular bar extending laterally and perpendicularly of said first leg, said rectangular bar having a flat wear surface adapted to be positioned against an outer surface of the beam to establish a point from which all dimensions are taken, said second leg having a channel at its other end, a T scale having a base and a vertical leg, means for slidingly receiving said vertical leg in said channel such that the lower surface of said base is adapted to be disposed flat on the surface of said web and a locking mechanism on said second leg for locking said scale in a predetermined position.

2. A tool as set forth in claim 1, wherein the lower surface of said base is even with an upper surface of said rectangular bar.

3. A tool as set forth in claims 1 or 2, wherein said rectangular bar, said flat surface and said first leg are orthogonal to each other.

4. A tool as set forth in claims 1 or 2, wherein said vertical leg includes a groove on at least one side thereof and said second leg includes rail means engaging said groove for slidingly supporting said T scale.

5. A tool as set forth in claims 1 or 2, wherein said locking mechanism includes an apertured boss having internal threads, said boss extending upwardly from the other end of said second leg and terminating at a distance intermediate the ends of said second leg, an aperture in said second leg extending outwardly and inwardly from said termination and a thumb screw threadingly received in said boss and having a head positioned in said aperture.

* * * * *